United States Patent [19]

Stark, Sr. et al.

[11] Patent Number: 4,906,368

[45] Date of Patent: Mar. 6, 1990

[54] EXPANDABLE FIBERGLASS PRESSURE VESSEL HAVING INTERNAL PIPE CONNECTION

[76] Inventors: Robert G. Stark, Sr., 735 Northeast 198th St., Seattle, Wash. 98155; Robert G. Stark, Jr., 11643 100th Ave. Northeast, #3A, Kirkland, Wash. 98033; Janet S. Ellis, 1225 Coronado Pl., Edmonds, Wash. 98020; Tom Stark, 551 Lakeside Dr., Sedro Wooley, Wash. 98284

[21] Appl. No.: 797,691

[22] Filed: Nov. 13, 1985

Related U.S. Application Data

[62] Division of Ser. No. 558,345, Dec. 5, 1983, Pat. No. 4,588,106.

[51] Int. Cl.⁴ .............................................. B01D 35/30
[52] U.S. Cl. ................................... 210/279; 210/287; 210/416.2; 220/208; 137/592
[58] Field of Search .................... 210/169, 221.2, 279, 210/287, 416.2, 446, 236, 275, 288, 407, 411, 412, 416.1, 438; 220/203, 205, 208, 240, DIG. 7; 137/590, 592

[56] References Cited

U.S. PATENT DOCUMENTS

| | | | |
|---|---|---|---|
| 1,873,037 | 8/1932 | Ringgenberg | 137/592 |
| 3,038,632 | 6/1962 | Brown et al. | 220/240 |
| 3,335,898 | 8/1967 | Eisinga, Jr. | 220/240 |
| 3,647,108 | 3/1972 | Kemp | 220/240 |
| 3,779,387 | 12/1973 | Day et al. | 210/279 |
| 3,847,805 | 11/1974 | Voedisch | 210/279 |
| 4,065,388 | 12/1977 | Flynn et al. | 210/279 |
| 4,127,485 | 11/1978 | Baker et al. | 210/275 |
| 4,379,050 | 4/1983 | Hess et al. | 210/279 |
| 4,479,880 | 10/1984 | Treanor | 210/275 |
| 4,556,487 | 12/1985 | Ueda | 210/279 |

Primary Examiner—Richard V. Fisher
Assistant Examiner—Wanda L. Millard
Attorney, Agent, or Firm—Seed and Berry

[57] ABSTRACT

An apparatus for use in conjunction with a pressure vessel, having a tubular conduit extending into the interior of the pressure vessel. The outer end of the conduit is rigidly fixed to one end of the pressure vessel in a pressure-tight connection. The inner end of the conduit is attached to a saddle at the other end of the pressure vessel, where the saddle is adapted to slidably receive the conduit such that upon expansion of the pressure vessel due to pressurization, the conduit will move independently relative to the saddle.

5 Claims, 4 Drawing Sheets

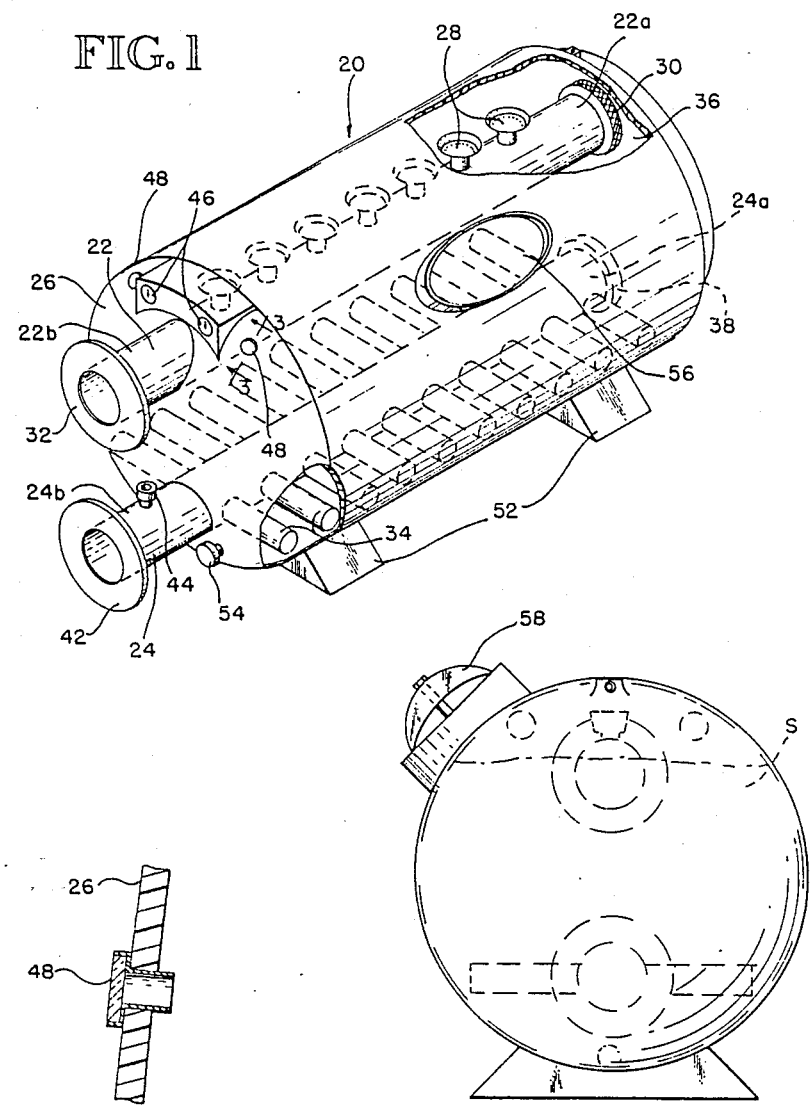

EXPANDABLE FIBERGLASS PRESSURE VESSEL HAVING INTERNAL PIPE CONNECTION

This application is a division of U.S. patent application Ser. No. 558,345, filed Dec. 5, 1983, now U.S. Pat. No. 4,588,106.

TECHNICAL FIELD

The field of the present invention is pressure vessels or tanks capable of withstanding high pressures, and more specifically, pressure vessels composed of fiberglass, and methods for producing the same, and securing tubular conduits composed of a material not readily adherable to fiberglass thereto.

BACKGROUND ART

The conventional way of constructing fiberglass pressure vessels is to employ an inflatable mold which is subsequently wound with fiberglass filament. Resin is then applied to the filament and allowed to solidify. After the fiberglass and resin have solidified, the mold is then deflated and removed from a port in the completed tank. This method has several disadvantages.

DISCLOSURE OF INVENTION

Briefly stated, the present invention consists of two separately formed vessel halves having opposite ends which are joined to form a compartment along a juncture. One of the vessel halves is provided with a service port of a size sufficient to permit an individual to fully enter the compartment formed by the joined vessel halves for working therein. The compartment is then sealed at the juncture by applying a bonding layer surrounding both sides of the juncture, inside and outside of the compartment. The compartment is then wrapped circumferentially with tensioned, resin-wetted fiberglass filament in one direction, substantially parallel to the juncture, and in another direction substantially transverse to the juncture. The compartment is then coated with a filler resin between and around the filaments to form a rigid exterior. This method provides for the construction of pressure vessels for a variety of applications.

In addition, the invention provides for a method of joining tubular conduits to the fiberglass vessel in sealed and integrally bonded relationship where the conduits are composed of a material dissimilar to the fiberglass and where the material will not readily adhere to the fiberglass. The method of joining the tubular conduit to the fiberglass generally consists of forming a series of striations and roughened surface on the tubular conduit, wrapping resin-wetted fiberglass filament circumferentially under tension around and in the grooves of the striated portion to form a rigid, fluid-tight seal between the tubular conduit and the filaments and to provide a fiberglass-compatible bonding surface rigidly locked into the striations, then overlaying a layer of fiberglass matting and resin over the filament-wrapped striations. A second layer of resin-wetted, tensioned filaments may be added over the fiberglass matting. The wrapped conduit is then inserted into a hole in the tank, with the wrapped portion of the conduit extending beyond both sides of the hole. Additional fiberglass matting and resin are then applied to close the hole around the tubular conduit and firmly bond the conduit to the tank. Resin-wetted fiberglass filaments are then wrapped circumferentially around the vessel and the rigid, fluid-tight seal between the conduit vessel to integrally join the sealed conduit to the vessel filament wrap.

This method of joining dissimilar PVC conduits to fiberglass also has application for other types of tubular couplings or fittings.

BRIEF DESCRIPTION OF THE DRAWINGS

FIG. 1 is a fragmentary isometric view of a vessel embodying the present invention.

FIG. 2 is a side elevational view of the vessel of FIG. 1.

FIG. 3 is an enlarged cross-sectional view taken substantially along the line 3—3 of FIG. 1.

BEST MODE FOR CARRYING OUT THE INVENTION

Figure 4:
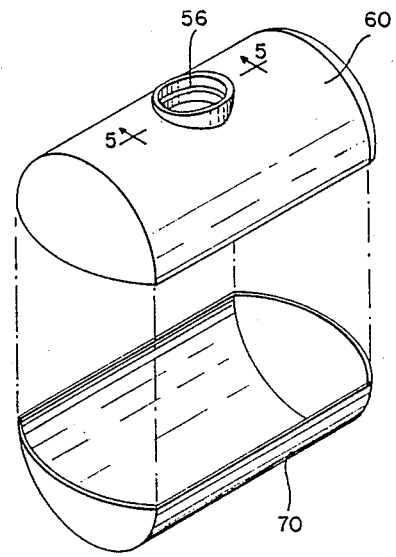
FIG. 4 is a view of upper and lower vessel halves illustrating and showing a service port in one of the vessel halves.
Figure 5:
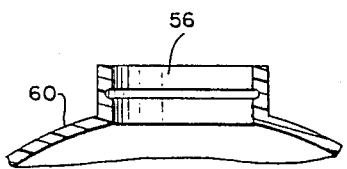
FIG. 5 is an enlarged cross-sectional view taken substantially along the line 5—5 of FIG. 4.

In reference to FIG. 1, the vessel or tank includes a compartment 20 provided with a tubular conduit 22, such as an influent header, and a tubular conduit 24, such as an effluent header, extending longitudinally through a vessel wall 26, the tubular conduit 22 and tubular conduit 24 being held in sealed and integrally bonded relationship to the vessel wall 26. Tubular conduit 22 is provided with a series of spray nozzles or heads 28 which function to disperse the fluid from conduit 22 into the interior of compartment 20. In one application of the invention, the fluid from conduit 22 could be soiled water from a swimming pool. This water would be dispersed through heads 28 onto a filtering sand S which would be present within compartment 20.

Tubular conduit 22 terminates at a saddle 30, which is securely mounted to vessel wall 36 of compartment 20. Saddle 30 is formed to slidably receive the inner end 22a of conduit 22 in a manner which allows conduit 22 to move independently relative to saddle 30 when compartment 20 expands or contracts due to changes in pressure. The outer end 22b of conduit 22 extends outwardly from vessel wall 26 and is provided with flange 32 for connection to a mating end of a water supply line (not shown).

Tubular conduit 24 is provided with a series of perforated tubes 34 which extend laterally from conduit 24 and provide widely dispersed channels through which conduit 24 can communicate with the interior of compartment 20. Perforated tubes 34 preferably are provided with a plurality of openings of a size sufficient to allow water or other liquids to pass through them, but not so large that they will allow sand to enter the perforated tubes. Tubular conduit 24 terminates at saddle 38, which is securely mounted to vessel wall 36 of compartment 20. Saddle 38 is formed to slidably receive the inner end 24a of conduit 24 in a manner which allows conduit 24 to move independently relative to saddle 38 when compartment 20 expands or contracts due to changes in pressure. The outer end 24b of conduit 24 extends outwardly from vessel wall 26 and is provided with flange 42 for connection of the invention to a mating end of a water return line (not shown). Outer end 24b is also provided with nipple 44 to facilitate the attachment of an external air compressor (not shown) for agitating the sand when reverse flushing the sand for cleaning.

Shown on the exterior surface of vessel wall 26 are a pair of pressure gauges 46 which function to independently measure the fluid pressure within conduits 22 and 24. Gauges 46 may be color-coded to aid the operator in monitoring the operation of the pressure vessel.

Vessel wall 26 may also be provided with viewing ports 48 to aid the operator in surveying the interior of compartment 20 while the system is in operation. As best shown in FIG. 3, viewing port 48 extends through vessel wall 26 to allow an unobstructed view of the interior of compartment 20 while maintaining the internal pressure of compartment 20. In operation, an individual shines a portable light source through one view port while observing the interior of compartment 20 through the other view port.

Referring again to FIG. 1, compartment 20 may be mounted on base members 52 in order to maintain its position during operation. Compartment 20 may also be provided with drain 54 to allow for the complete withdrawal of fluid from compartment 20 without dismantling compartment 20.

Compartment 20 is also provided with service port 56 which is positioned to allow a workman full ingress into and egress from the interior of compartment 20. This provides a convenient mode for servicing any and all of the vessel's internal components. As best shown in FIG. 2, service port 56 is side-mounted on compartment 20 and is provided with a plug 58 which serves to close off the interior of compartment 20.

Figure 13:
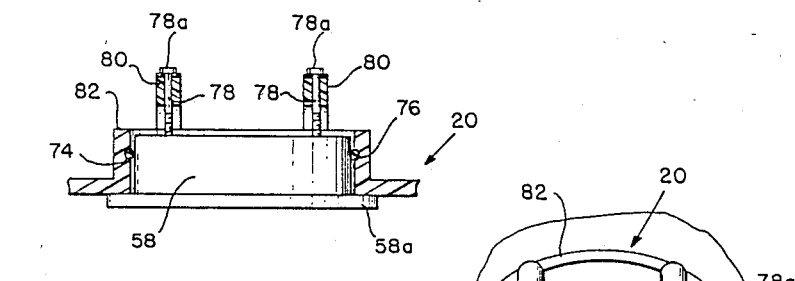
FIG. 13 is an enlarged cross-sectional view of the service port with a plug.

As shown in FIG. 13, plug 58 is provided with a groove 74 which holds an O-ring seal 76. The use of an O-ring seal is a marked improvement over prior known tanks that employ a gasket positioned between the flange 58a of the plug and the inside surface of the compartment 20. Gaskets undesirably require close manufacturing tolerances to be effective and are more susceptible to damage and the loss of a seal. The O-ring seal of this invention allows the service port to be manufactured with non-critical tolerances. This provides the capability of molding the service port during the formation of the initial compartment halves as in FIG. 4 and molding the O-ring groove also at that time. A much better and more reliable seal also results. Obviously, the O-ring groove 74 could be in the plug 58 and the service port molded with a smooth surface for engagement by an O-ring if desired. Further, the O-ring itself could be square or rectangular, as well as of a circular cross-section.

As further shown in FIG. 2, in one application of the invention, compartment 20 may be filled with sand to the level indicated by dashed line S. As mentioned above, soiled fluid could be dispersed through heads 28 onto the bed of sand. By means of pressure and gravitational force, the fluid would filter downward through the sand. The filtered fluid could then be withdrawn through tubular conduit 24 via tubes 34.

Turning to FIG. 4, the first step in one method of constructing the device is shown. As shown in FIG. 4, what will become compartment 20 is comprised of two separately formed vessel halves 60 and 70. Vessel half 60 is provided with service port 56 positioned at the highest arcuate point of vessel half 60. The port initially is formed at the center of the vessel half 60 so that it will not interfere with removal of the vessel half from a mold, and is of a size sufficient to an individual to fully enter the vessel for working therein.

Figure 8:
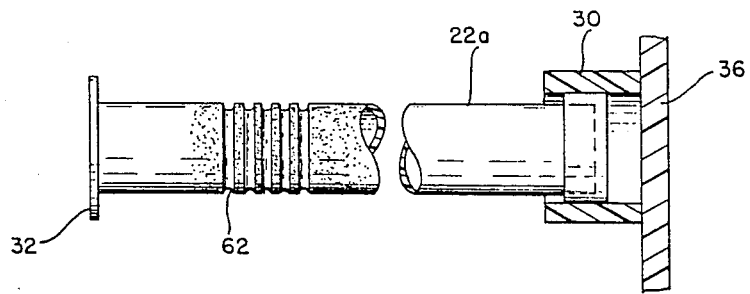
FIG. 8 is an enlarged fragmentary side elevational view of a conduit used in the invention.

As best shown in FIG. 8, formed on a portion of tubular conduits 22 and 24 are a series of circumferentially extending depressions or striations 62. These depressions 62 are formed on the portion of conduits 22 and 24 which will be positioned adjacent to vessel wall 26 when conduits 22 and 24 are installed. The portion of conduits 22 and 24 which will be positioned adjacent to vessel wall 26 are also roughened to make the surface of conduits 22 and 24 better suited to receiving fiberglass filament. The depressions 62 of tubular conduits 22 and 24 are circumferentially wrapped with tensioned fiberglass filament 64 which has previously been fed through and coated with a catalyzed resin to form a fluid-tight seal between depressions 62 and filament 64, and to provide a fiberglass-compatible bonding surface rigidly locked into depressions 62.

The filaments are then wrapped with about one and one-half ounces of mat and resin; and finally (although not always necessary), another wrap of resin-wetted fiberglass filaments under tension is applied. The wrapped conduit is then inserted into a hole in the vessel, with the wrapped portion protruding on either side of the hole.

The conduit 22 is inserted into the vessel until the inner end 22a is slidably received by saddle 30.

Figure 7:
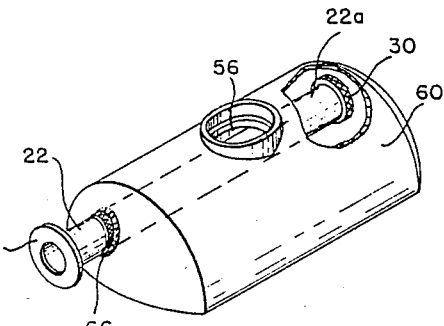
FIG. 7 is a fragmentary isometric view of the vessel half of FIG. 6 illustrating the step of overlaying the juncture of a conduit and a vessel wall with a layer of fiberglass material.
Figure 6:
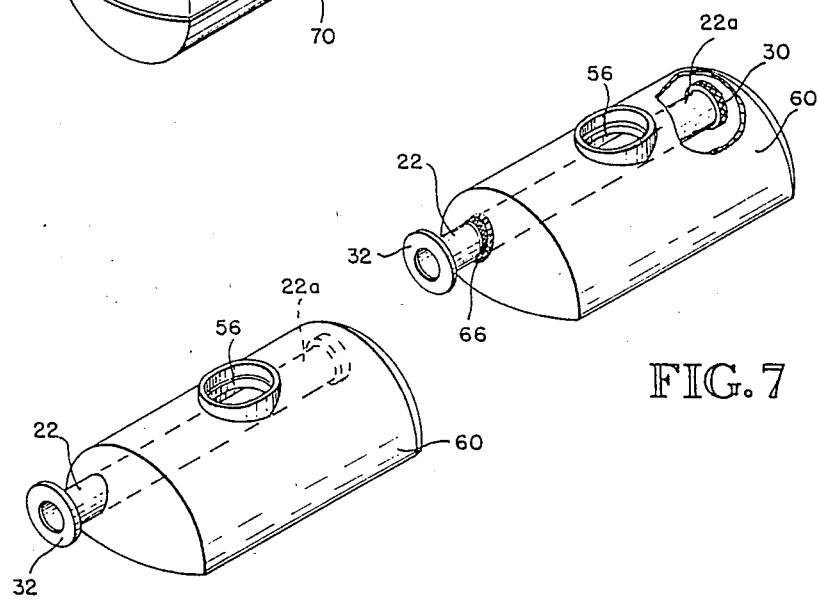
FIG. 6 is an isometric view of a vessel half of FIG. 4 illustrating the step of inserting a conduit into the vessel half.
Figure 9:
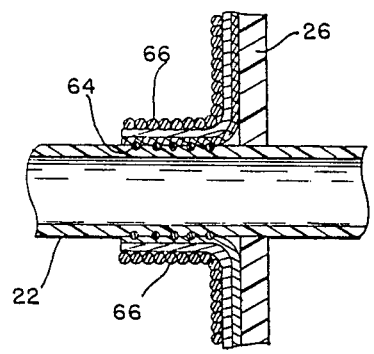
FIG. 9 is an enlarged cross-sectional view of the juncture of a conduit and a vessel wall illustrating the step of forming an integral pressure-tight connection between the two.

As shown in FIGS. 7 and 9, the juncture between filament-wound depressions 62 of tubular conduits 22 and 24 and vessel wall 26 is overlayed with a layer of fiberglass material 66. Applying resin to this overlay forms a rigid, fluid-tight seal between tubular conduits 22 and 24 and vessel wall 26.

Figure 10:
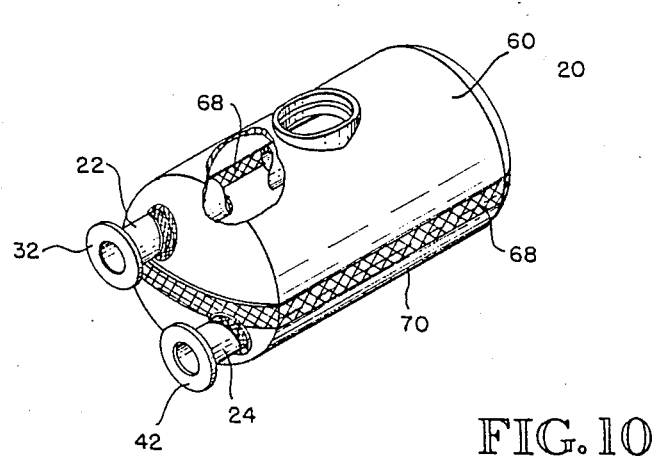
FIG. 10 is a fragmentary view of the vessel halves of FIG. 4 illustrating the step of sealing the vessel halves at their juncture with a layer of fiberglass material.

Turning to FIG. 10, vessel halves 60 and 70 have been brought into engagement. The juncture between the exposed edges of vessel halves 60 and 70 is then sealed by bonding a layer of fiberglass material 68 to the area surrounding both sides of the juncture, inside and outside of compartment 20, to form a fluid-tight seal between vessel halves 60 and 70.

Figure 11:
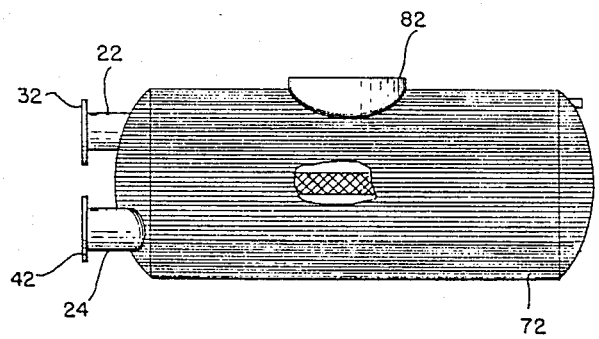
FIG. 11 is a side elevational view of the vessel of FIG. 10 illustrating the step of winding fiberglass filament substantially parallel to the juncture of the vessel halves.
Figure 12:
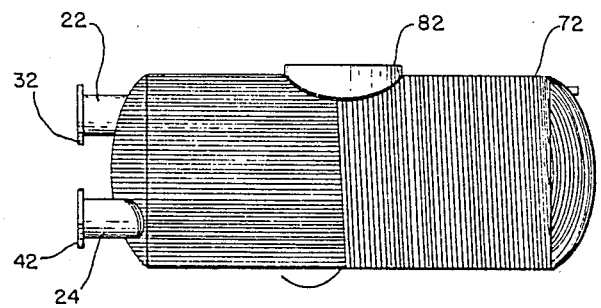
FIG. 12 is a side elevational view of the vessel of FIG. 10 illustrating the step of winding fiberglass filament substantially transverse to the juncture of the vessel halves.

Referring now to FIGS. 11 and 12, compartment 20 is wrapped with tensioned fiberglass filament 72 in one direction substantially parallel to the juncture between vessel halves 60 and 70 (FIG. 11), and in another direction substantially transverse to the juncture between the vessel halves 60 and 70 (FIG. 12). Prior to being wound around the exterior of compartment 20 tensioned fiberglass filament 72 is fed through and coated with a catalyzed resin to increase its capacity for adherence to compartment 20. The exterior of compartment 20, now wrapped with fiberglass filament 64, is coated with resin to embed fiberglass filament 72 in a rigid exterior coating. Additional coats of resin and thickener are then applied to fill in any voids between the wrapped filaments, and, subsequently, a final color coat is applied for aesthetic purposes.

Figure 14:
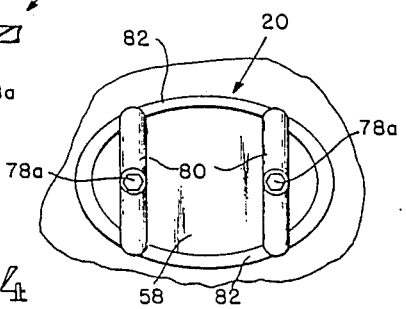
FIG. 14 is an enlarged top view taken substantially along the line 14—14 of FIG. 13.

As shown in FIG. 14, plug 58 is also provided with a pair of fasteners 78. The head 78a of fastener 78 engages bar 80, which extends across and rests upon the flange 82 on the exterior of compartment 20. When the head of fastener 78 is rotated, the flange 58a of plug 58 is brought into a locked position against the interior wall of compartment 20.

The resulting compartment or tank is capable of handling corrosive fluids and withstanding pressures in excess of 50 psi. Thus it is not only useful for swimming pool filtration tanks but also could be used with or without the conduits 22 or 24 for general chemical storage.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

I claim:

1. Apparatus for use in conjunction with a fiberglass pressure vessel, comprising:
   a tubular conduit extending into and communicating with the interior of a fiberglass pressure vessel, an outer end of said conduit rigidly connected to a first end of said pressure vessel in a pressure-tight connection, said pressure vessel formed of a material which will expand substantially parallel to said conduit; and
   a saddle fixedly attached to a second end of said pressure vessel, said saddle slidably receiving an inner end of said tubular conduit where upon expansion of the pressure vessel due to pressurization, said conduit will move independently relative to said saddle.

2. Apparatus of claim 1, further comprising a second tubular conduit connected to the pressure vessel in the same fashion as the first tubular conduit, and positioned substantially parallel to the first tubular conduit.

3. Apparatus of claim 2, wherein the pressure vessel is a tank used for filtering contaminants from water, and wherein the first tubular conduit is an inlet conduit for the contaminated water and the second tubular conduit is an outlet conduit for the water after filtration.

4. Apparatus for use in conjunction with a pressure vessel, comprising:
   a tubular conduit extending into and communicating with the interior of a pressure vessel, an outer end of said conduit rigidly connected to a first end of said pressure vessel in a pressure-tight connection, said pressure vessel formed of a material which will expand substantially parallel to said conduit;
   a saddle fixedly attached to a second end of said pressure vessel, said saddle slidably receiving an inner end of said tubular conduit where, upon expansion of the pressure vessel due to pressurization, said conduit will move independently relative to said saddle;
   a second tubular conduit connected to the pressure vessel in the same fashion as the first tubular conduit, and positioned substantially parallel to the first tubular conduit;
   where the pressure vessel is a tank used for filtering contaminants from water, and wherein the first tubular conduit is an inlet conduit for the contaminated water and the second tubular conduit is an outlet conduit for the water after filtration;
   a plurality of sprinkler heads located along the axial length of the inlet conduit; and
   a plurality of collector tubes extending from the outlet conduit in a substantially perpendicular configuration and located along the axial length of the outlet conduit.

5. Apparatus of claim 4 wherein said tank contains sand and is used for filtering contaminants from water used in a swimming pool.

* * * * *